(12) United States Patent
Hsu et al.

(10) Patent No.: US 7,585,112 B2
(45) Date of Patent: Sep. 8, 2009

(54) LINEAR MOTION GUIDE APPARATUS

(75) Inventors: Hsin Tsun Hsu, Taichung (TW); Yun Yi Lin, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 388 days.

(21) Appl. No.: 11/725,658

(22) Filed: Mar. 20, 2007

(65) Prior Publication Data

US 2008/0232727 A1      Sep. 25, 2008

(51) Int. Cl.
*F16C 29/06*   (2006.01)
(52) U.S. Cl. .......................................................... 384/45
(58) Field of Classification Search .............. 384/43–45
See application file for complete search history.

(56) References Cited

U.S. PATENT DOCUMENTS

| 6,807,746 B2 | 10/2004 | Matsumoto | 33/706 |
| 7,121,724 B2 | 10/2006 | Lee et al. | 384/45 |
| 2003/0053724 A1* | 3/2003 | Matsui et al. | 384/45 |
| 2005/0041896 A1* | 2/2005 | Itabashi et al. | 384/45 |
| 2007/0025651 A1* | 2/2007 | Kakei | 384/45 |

* cited by examiner

*Primary Examiner*—Thomas R Hannon
(74) *Attorney, Agent, or Firm*—Charles E. Baxley (57) ABSTRACT

A linear motion guide device includes a slider slidably attached onto a guide rail and each having one or more longitudinal grooves for forming a ball guiding channel between the slider and the guide rail, and two end caps attached to the ends of the slider, the slider includes two end portions each having two notches communicating with the longitudinal grooves, and two plates are disposed between the slider and the end caps and each include two or more ears engaged into the notches of the slider for anchoring the plates to the slider and each ear having an inclined surface for reducing the noises that may be generated by the movement of the ball bearing device.

13 Claims, 8 Drawing Sheets

LINEAR MOTION GUIDE APPARATUS

BACKGROUND OF THE INVENTION

1. Field of the Invention

The present invention relates to a linear motion guide apparatus, and more particularly to a linear motion guide apparatus including an improved ball guiding channel formed therein for facilitating the sliding of the ball bearing device through the linear motion guide apparatus and for preventing the ball bearing device from striking onto the linear motion guide apparatus and for reducing the noises that may be generated while the ball bearing device moves through the linear motion guide apparatus.

2. Description of the Prior Art

Typical linear motion guide devices comprise a slider or slide block slidably attached onto a guide rail, and normally, a ball bearing device disposed between the slider and the guide rail for facilitating the sliding movement between the slider and the guide rail and for allowing the slider and the guide rail to be smoothly moved relative to each other.

For example, U.S. Pat. No. 7,121,724 to Lee et al. discloses one of the typical linear motion rolling guide devices comprising a slider or slide block slidably attached onto a guide rail, and two end caps attached onto the side portions of the slide block, the slide block and the end caps are required to be formed with an endless ball guiding channel therein for receiving the ball bearing device and for allowing the ball bearing device to smoothly move through the linear motion guide apparatus.

However, when the slide block and the end caps are attached or secured together, the endless ball guiding channel may not be precisely formed by the slide block and the end caps and one or more gaps or one or more protruded angles may be formed between the slide block and the end caps such that the ball bearing device may have a good chance to strike onto the protruded angles that are formed between the slide block and the end caps, and such that the great noises may have a good chance to be generated by the striking of the ball bearing device onto the protruded angles of the slide block and the end caps.

U.S. Pat. No. 6,807,746 to Matsumoto discloses a further typical linear motion rolling guide apparatus also comprising a slider or slider slidably attached onto a guide rail, and two end caps and two end seals or wiper devices attached onto the slider, and one or more rolling-element rolling grooves formed in the guide rail and the slider and the end caps for slidably receiving the rolling element.

For allowing the rolling element to smoothly move or slide through the rolling-element rolling grooves formed in the guide rail and the slider and the end caps, the slider includes a linear crowning disposed at both sides thereof for engaging with the rolling element and for guiding the rolling element to smoothly move or slide through the rolling-element rolling grooves and for preventing the great noises from being generated between the rolling element and the slider and the end caps.

However, the rolling-element rolling grooves also may not be precisely formed by the slider and the end caps and the guide rail when the slider and the end caps are attached onto the guide rail and secured together such that the rolling element also may have a good chance to strike onto the slider and the end caps and such that the great noises also may be generated by the rolling element and the slider and the end caps.

The present invention has arisen to mitigate and/or obviate the afore-described disadvantages of the conventional linear motion guide devices.

SUMMARY OF THE INVENTION

The primary objective of the present invention is to provide a linear motion guide apparatus including an improved ball guiding channel formed therein for facilitating the sliding of the ball bearing device through the linear motion guide apparatus and for preventing the ball bearing device from striking onto the linear motion guide apparatus and for reducing the noises that may be generated while the ball bearing device moves through the linear motion guide apparatus.

In accordance with one aspect of the invention, there is provided a linear motion guide apparatus comprising a guide rail including two side portions each having one or more longitudinal grooves formed therein, a slider slidably attached onto the guide rail and including a concave formed in a lower portion thereof for slidably receiving the guide rail and for allowing the slider to be guided to slide along the guide rail, the slider including two or more longitudinal grooves formed therein and facing toward the longitudinal grooves of the guide rail respectively for forming a ball guiding channel between the slider and the guide rail, and the slider including two end portions each having two notches formed therein and communicating with the longitudinal grooves and the concave of the slider respectively, two end caps attached to the end portions of the slider and each including a concave formed therein for slidably receiving the guide rail and for guiding the end caps to slide along the guide rail, the end caps each including two or more turnarounds formed therein and aligned with the longitudinal groove of the slider respectively for forming the ball guiding channel, and two plates disposed between the slider and the end caps respectively and each including a concave formed therein for slidably receiving the guide rail and for guiding the plates to slide along the guide rail, the plates each including two or more ears extended therefrom and engaged into the notches of the slider respectively for stably anchoring and positioning the plates to the slider and for facilitating the sliding of a ball bearing device through the ball guiding channel and for preventing the ball bearing device from striking onto the linear motion guide apparatus and for reducing the noises that may be generated while the ball bearing device moves through the linear motion guide apparatus.

The plates each include an inverted U-shaped structure having two side legs and a beam laterally coupled between the side legs, the ears of the plates are extended from the side legs of the plates respectively.

The plates each include one or more recesses formed in each of the side legs and aligned with the longitudinal grooves of the slider respectively. The ears of the plates are preferably extended from the side legs of the plates respectively and aligned with the recess of the side legs of the plate to partially form the recess of the side legs of the plate.

The slider includes two or more ball return pathways formed through the slider for forming the ball guiding channel between the slider and the guide rail together with the longitudinal groove of the guide rail, and the plates each include one or more voids formed in each of the side legs and aligned with the ball return pathways of the slider respectively for forming the ball guiding channel together with the ball return pathways of the slider and also for smoothly receiving such as a ball bearing device.

A ball bearing device may further be provided and disposed between the slider and the guide rail and disposed in the ball guiding channel for facilitating a sliding movement between the slider and the guide rail. The ball bearing device includes a number of rolling members guided to smoothly move or slide along the ball guiding channel for preventing the ball bearing device from striking onto the linear motion guide apparatus and for reducing the noises that may be generated while the ball bearing device moves through the linear motion guide apparatus.

The ball bearing device includes a retaining device to couple the rolling members together and having a number of spacers disposed between the rolling members and having one or more bars for coupling the rolling members together. The slider includes one or more passages formed therein for slidably receiving the bars of the retaining device.

The plates each include an inclined surface formed in an outer peripheral portion of each of the ears for forming a smooth ball guiding structure between the turnarounds of the end caps and the longitudinal grooves of the slider and for forming a smooth ball guiding structure for the ball guiding channel of the linear motion guide device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-4, a linear motion guide apparatus 1 in accordance with the present invention comprises a guide rail 10 including a substantially I-shaped cross section having one or more longitudinal grooves 11 formed in the side portions thereof, and a slide block or a slider 20 slidably attached onto the guide rail 10 and arranged to be moved along the guide rail 10, and normally, two end caps 30 disposed on the two sides or end portions or outer portions of the slider 20 and attached or secured to the slider 20 with such as fasteners or latches (not shown) or the like. Two dust caps or wipers 50 may further be provided and disposed on the outer portions of the end caps 30 and to be attached or secured onto the end caps 30 with such as fasteners or latches (not shown) or the like.

Figure 1:
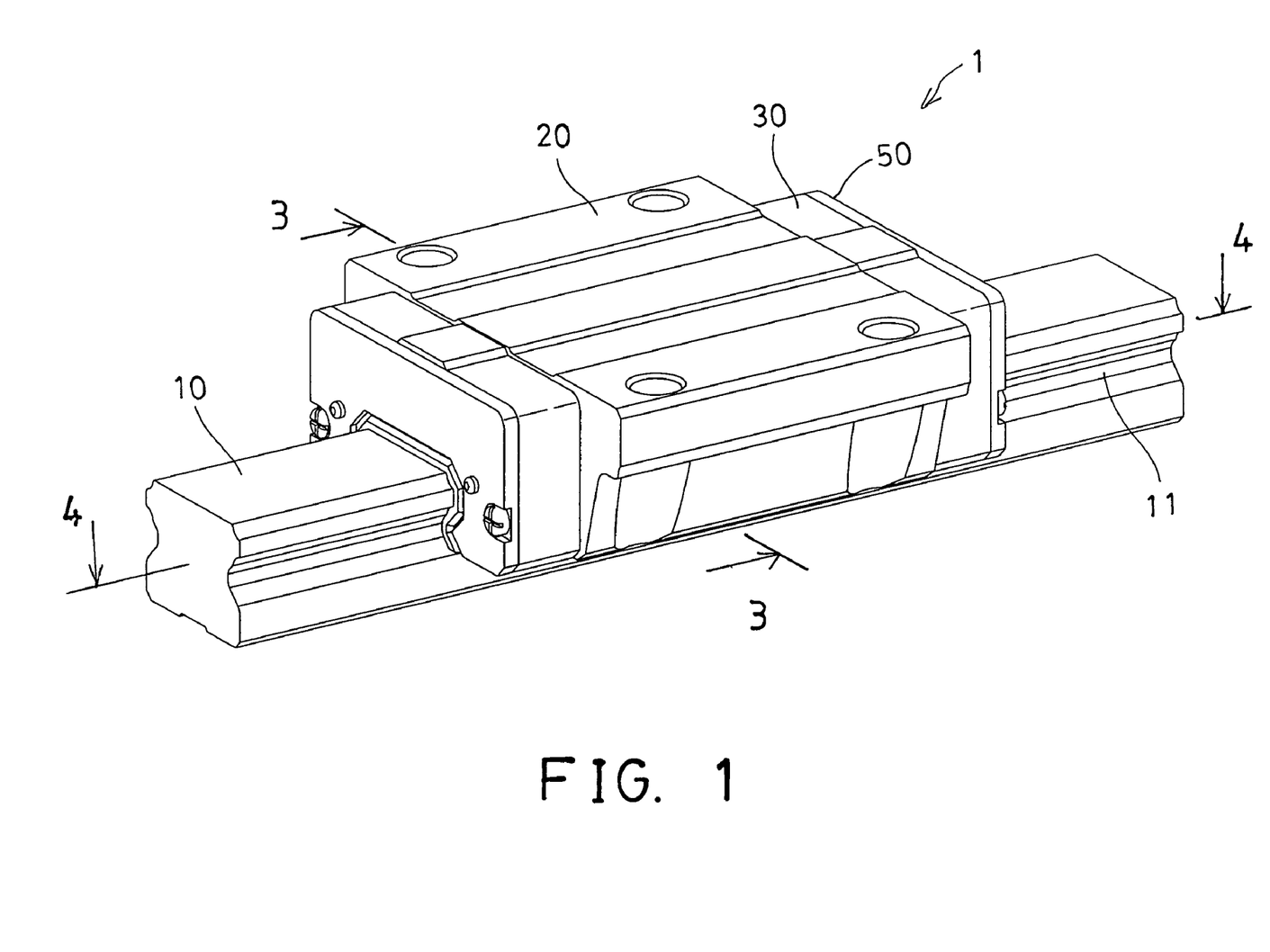
FIG. 1 is a perspective view of a linear motion guide apparatus in accordance with the present invention.
Figure 2:
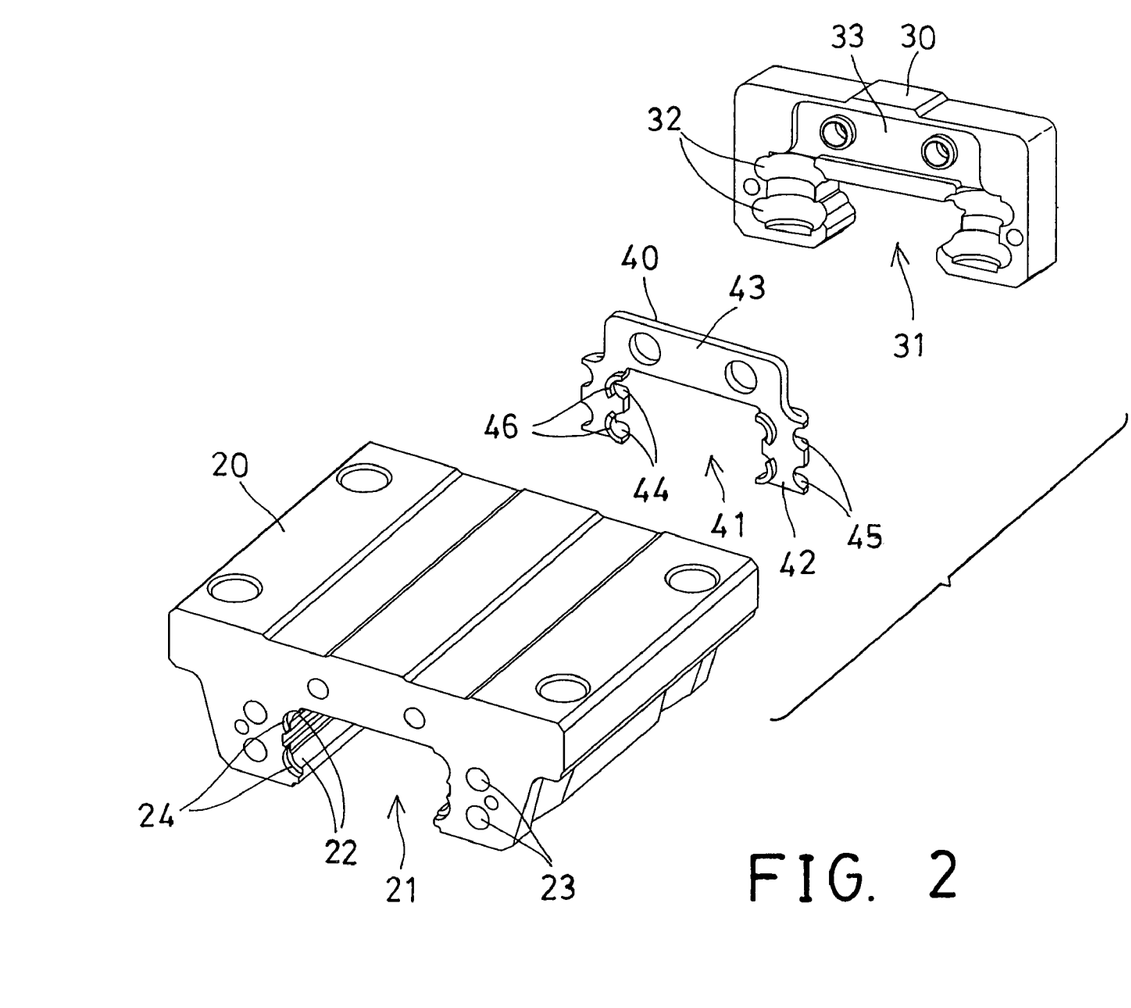
FIG. 2 is a partial exploded view illustrating an end cap of the linear motion guide apparatus.
Figure 3:
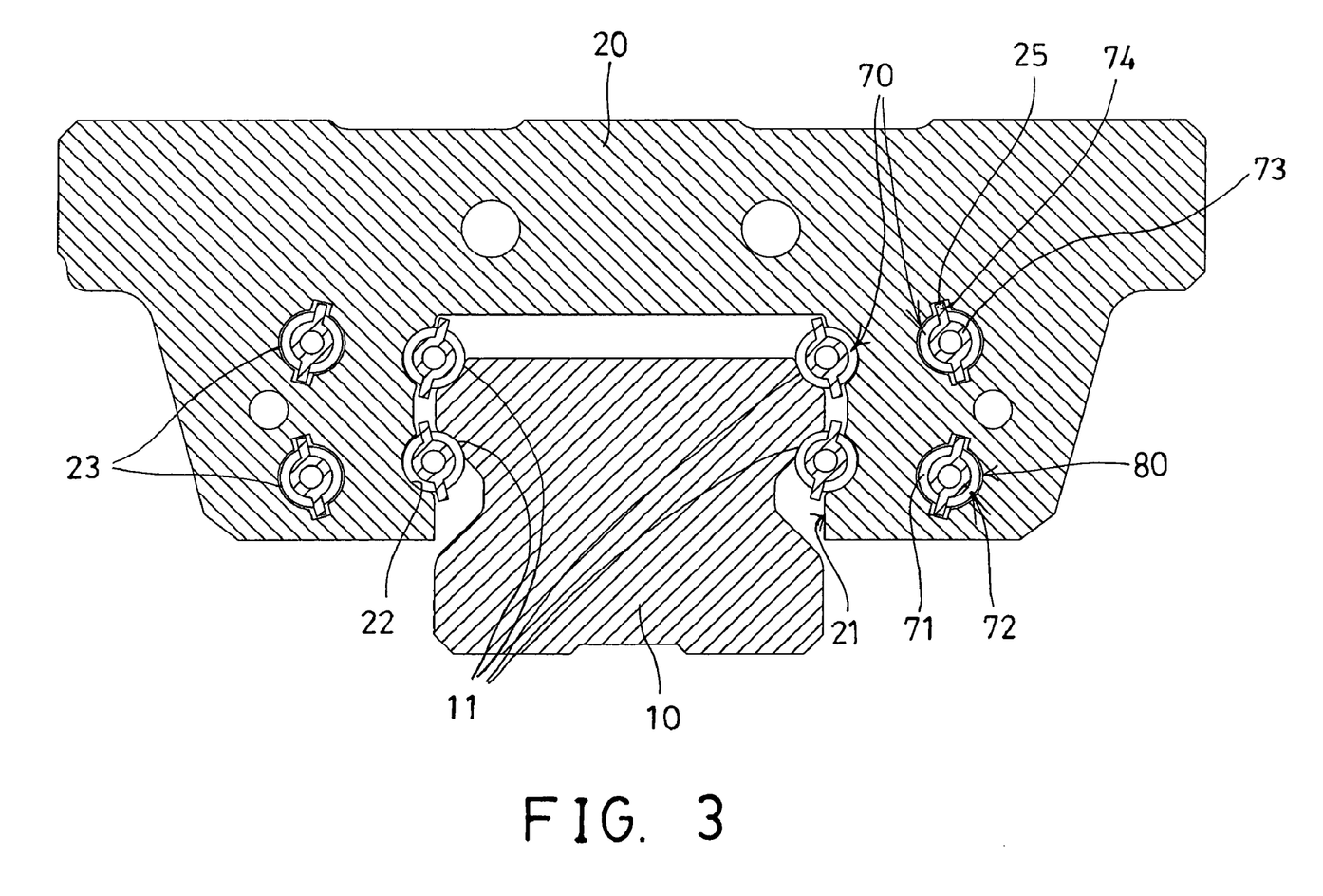
FIG. 3 is a cross sectional view of the linear motion guide apparatus taken along lines 3-3 of FIG. 1.
Figure 4:
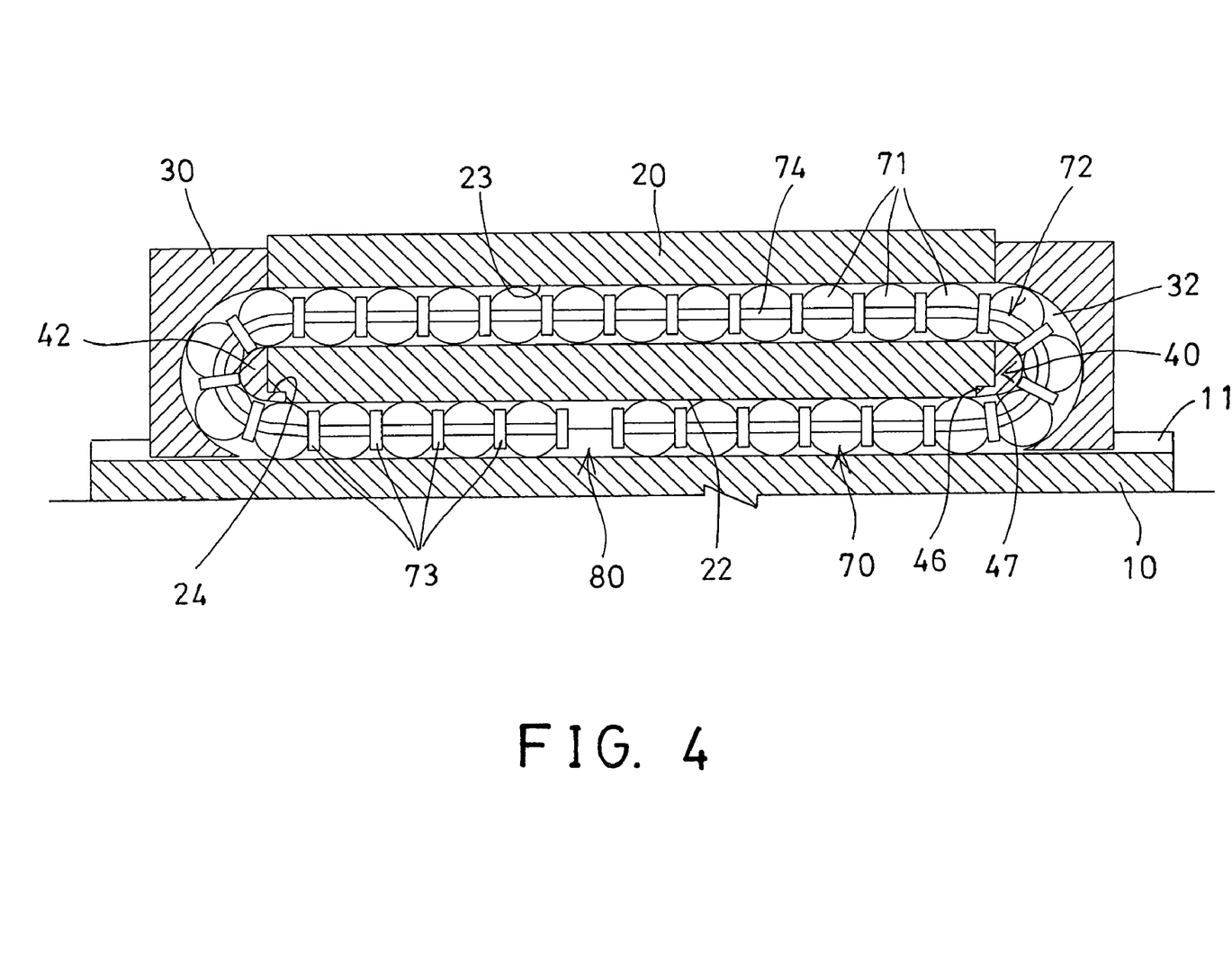
FIG. 4 is a partial cross sectional view of the linear motion guide apparatus taken along lines 4-4 of FIG. 1.

As shown in FIGS. 3-5 and 8, a ball bearing device 70 is to be disposed between the slider 20 and the guide rail 10 for facilitating the sliding movement between the slider 20 and the guide rail 10 and for allowing the slider 20 and the guide rail 10 to be smoothly moved relative to each other. The securing of the wipers 50 to the end caps 30 and the securing of the end caps 30 to the slider 20 are not related to the present invention and will not be described in further details. As shown in FIGS. 2 and 3, the slider 20 and the end caps 30 each include a concave 21, 31 formed in the lower portion thereof for slidably receiving or engaging onto the guide rail 10 and for allowing the slider 20 and the end caps 30 to be guided to slide along the guide rail 10.

The slider 20 includes one or more longitudinal grooves 22 formed in the inner and side portions thereof and facing toward the corresponding longitudinal grooves 11 of the guide rail 10 and/or one or more ball return pathways 23 longitudinally formed through the slider 20 (FIGS. 2-5) for forming one or more endless fore-and-aft raceway grooves or ball guiding channels 80 between the slider 20 and the guide rail 10 and/or the end caps 30 together with the longitudinal grooves 11 of the guide rail 10 and for slidably receiving the ball bearing device 70 and for allowing the ball bearing device 70 to smoothly move through the endless ball guiding channels 80 of the linear motion guide apparatus 1 and thus for allowing the slider 20 to smoothly move or slide along the guide rail 10. The slider 20 further includes one or more notches 24 formed in each of the end portions and communicating with the longitudinal grooves 22 and the concave 21 of the slider 20, or formed in the end portions of the respective longitudinal grooves 22 of the slider 20.

The end caps 30 each further include one or more U-shaped indentations or turnarounds 32 (FIG. 2) formed therein and aligned with the longitudinal grooves 22 and the pathways 23 of the slider 20 (FIGS. 4, 5) for forming the endless fore-and-aft raceway grooves or ball guiding channels 80 and for allowing the ball bearing device 70 to smoothly move through the endless ball guiding channels 80 of the linear motion guide apparatus 1 cyclically. The end caps 30 each may further include a depression 33 formed in one side or the inner portion thereof for fitting or receiving a plate 40 therein which may thus be disposed or retained between the slider 20 and the end caps 30 and which also includes a concave 41 formed in the lower portion thereof for slidably receiving or engaging onto the guide rail 10 and for forming an inverted U-shaped structure having two side legs 42 and a beam 43 laterally coupled between the two side legs 42.

The plate 40 further includes one or more recesses 44 formed in the inner portion of each of the side legs 42 and aligned with the longitudinal grooves 22 of the slider 20 respectively, and one or more voids 45 formed in the outer portion of each of the side legs 42 and aligned with the pathways 23 of the slider 20 respectively and also for forming the endless ball guiding channels 80 of the linear motion guide apparatus 1. The plate 40 further includes one or more ears 46 laterally extended out from each of the side legs 42 and aligned with the recesses 44 of the side legs 42 of the plate 40 for partially forming or defining the recesses 44 of the side legs 42 of the plate 40 and for extending or engaging into the corresponding notches 24 of the slider 20 (FIGS. 4, 5) and for stably anchoring or positioning the plate 40 to the slider 20.

In operation, as shown in FIGS. 3-5 and 9, the ball bearing device 70 may thus be guided to smoothly move from the turnarounds 32 of the end caps 30 to the longitudinal grooves 22 and/or the pathways 23 of the slider 20 respectively and for preventing the ball bearing device 70 from striking onto the end caps 30 and the slider 20 and the plate 40 and thus for allowing the ball bearing device 70 to smoothly move through the endless ball guiding channels 80 of the linear motion guide apparatus 1 without generating noises. It is preferable that the plate 40 further includes a tapered or inclined surface 47 formed in the outer peripheral portion of each of the ears 46 (FIGS. 4, 5, 9) for forming a smooth ball guiding structure to and between the turnarounds 32 of the end caps 30 and the longitudinal grooves 22 or for forming a smooth ball guiding structure for the endless ball guiding channels 80 of the linear motion guide apparatus 1, and for further guiding the ball bearing device 70 to smoothly move through the turnarounds 32 of the end caps 30 and the longitudinal grooves 22 and/or the pathways 23 of the slider 20 and the recesses 44 and the voids 45 of the side legs 42 of the plate 40.

Figure 5:
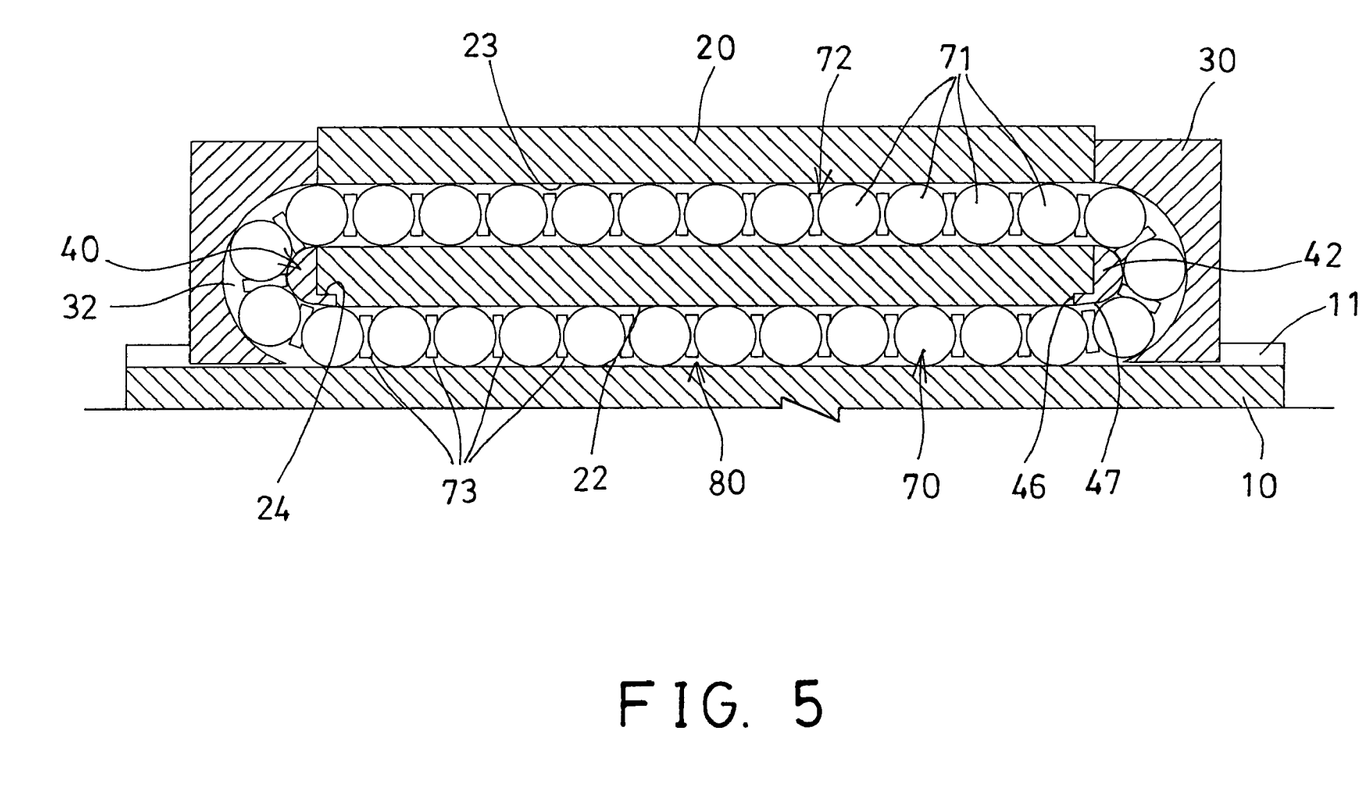
FIG. 5 is a partial cross sectional view similar to FIG. 4, illustrating the other arrangement of the linear motion guide apparatus.
Figure 9:
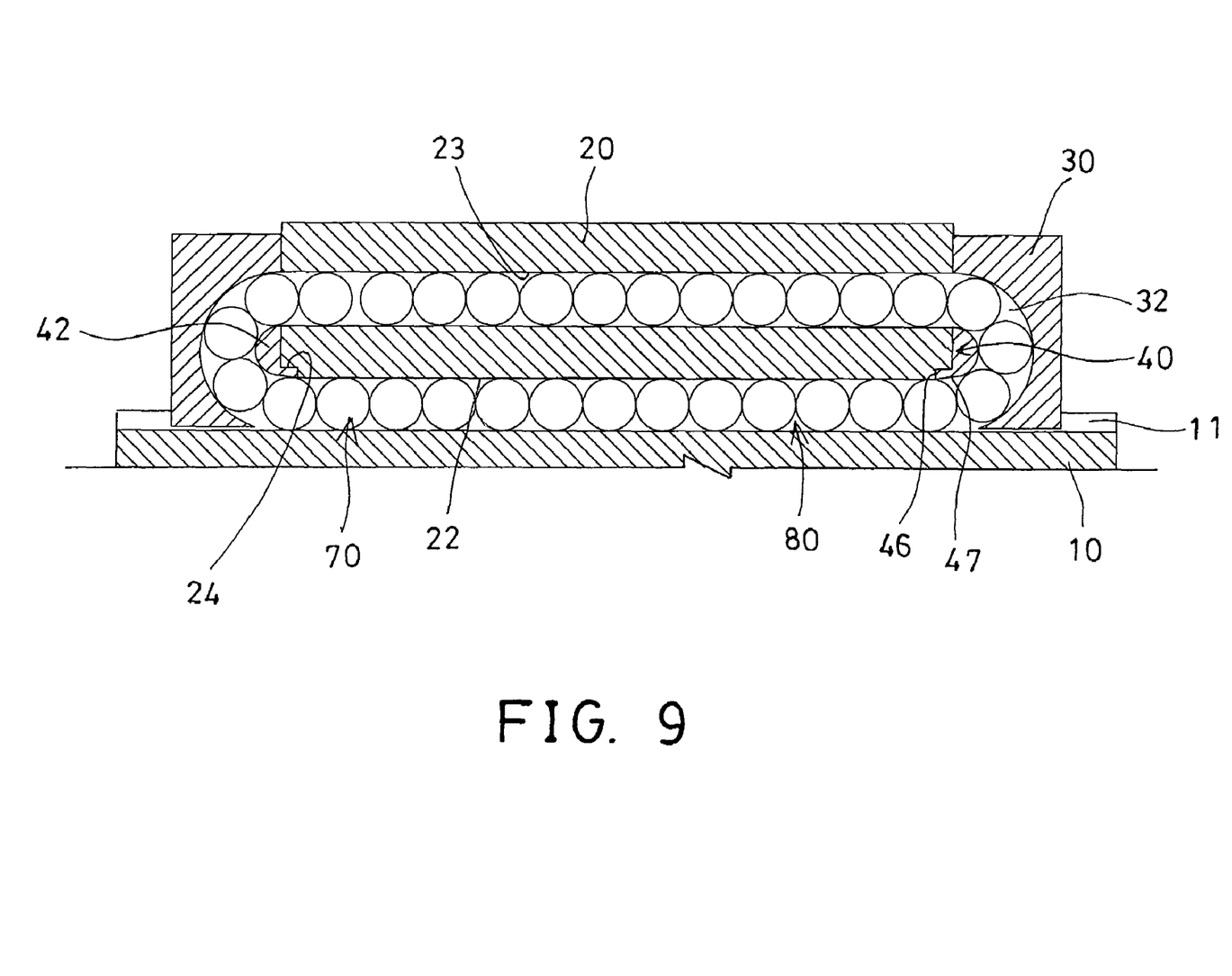
FIG. 9 is a partial cross sectional view similar to FIGS. 4 and 5, illustrating the further arrangement of the linear motion guide apparatus.

As shown in FIGS. 3-5 and 8, the ball bearing device 70 includes a number of rollers or balls or rolling members 71 retained in line by a retaining device 72 which includes a number of spacers 73 disposed between the balls or rolling members 71 and coupled together with one or more (such as two) side and longitudinal bars 74 for allowing the balls or rolling members 71 to be coupled together and in line with each other and thus for allowing the balls or rolling members 71 to be stably guided to smoothly move through the endless ball guiding channels 80 of the linear motion guide apparatus 1. The balls or rolling members 71 may also be suitably spaced away from each other with the spacers 73 without the bars 74 (FIG. 5). The balls or rolling members 71 may also be guided to smoothly move through the endless ball guiding channels 80 of the linear motion guide apparatus 1 without the spacers 73 and the bars 74 of the retaining device 72 (FIG. 9).

Figure 6:
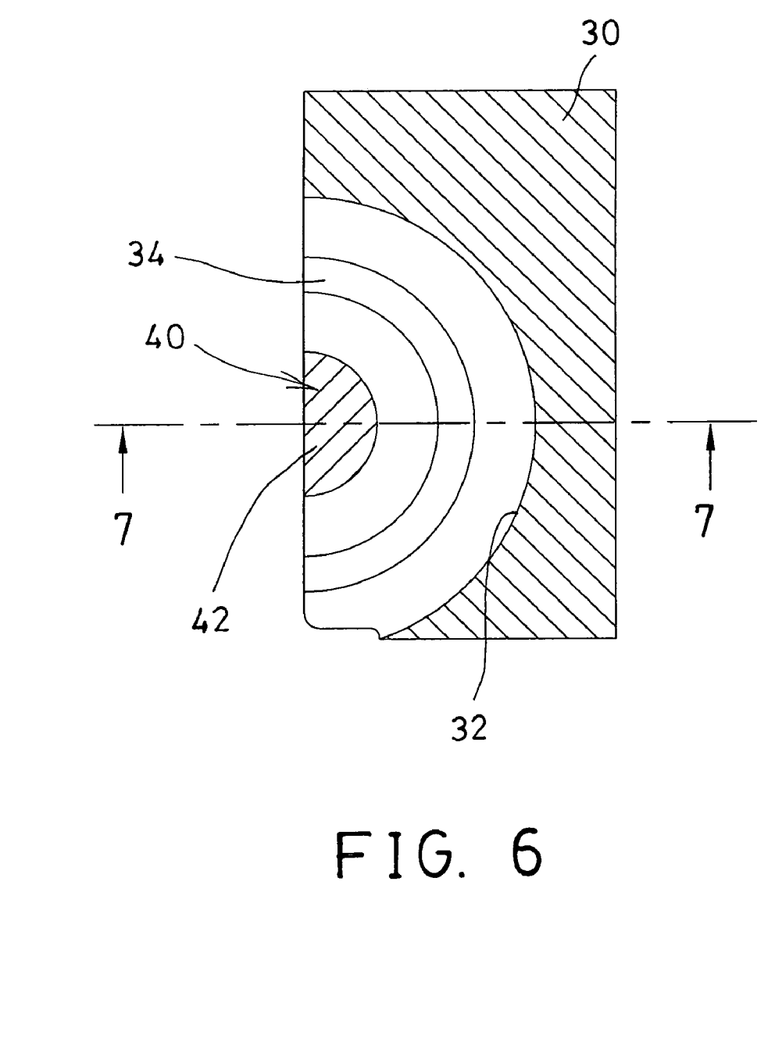
FIG. 6 is a partial cross sectional view taken along lines 6-6 of FIG. 7.
Figure 7:
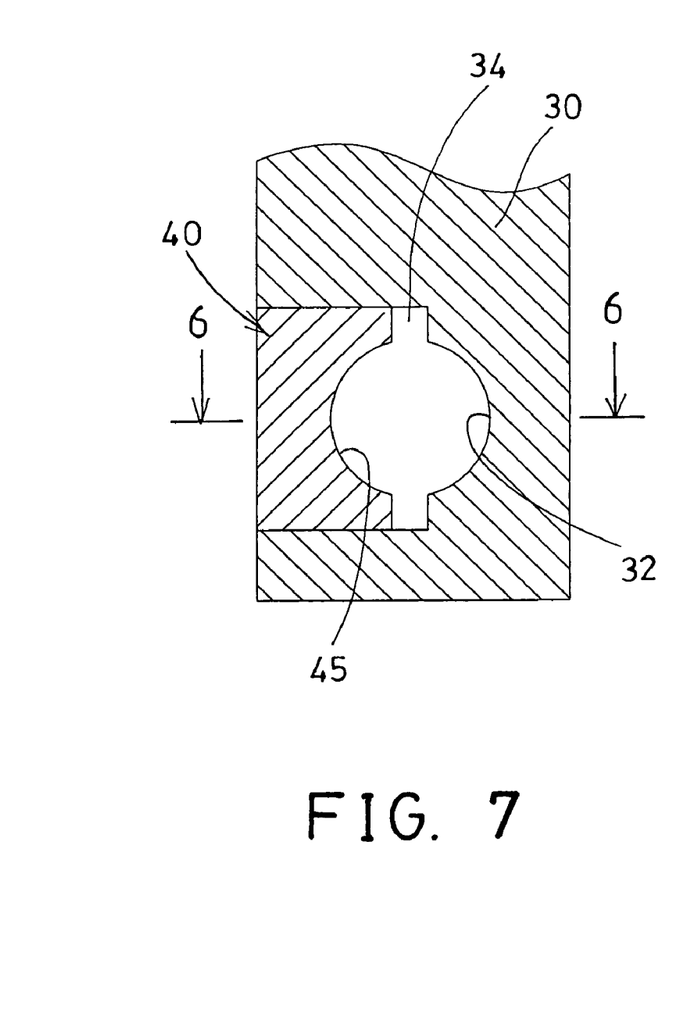
FIG. 7 is a partial cross sectional view taken along lines 7-7 of FIG. 6.
Figure 8:
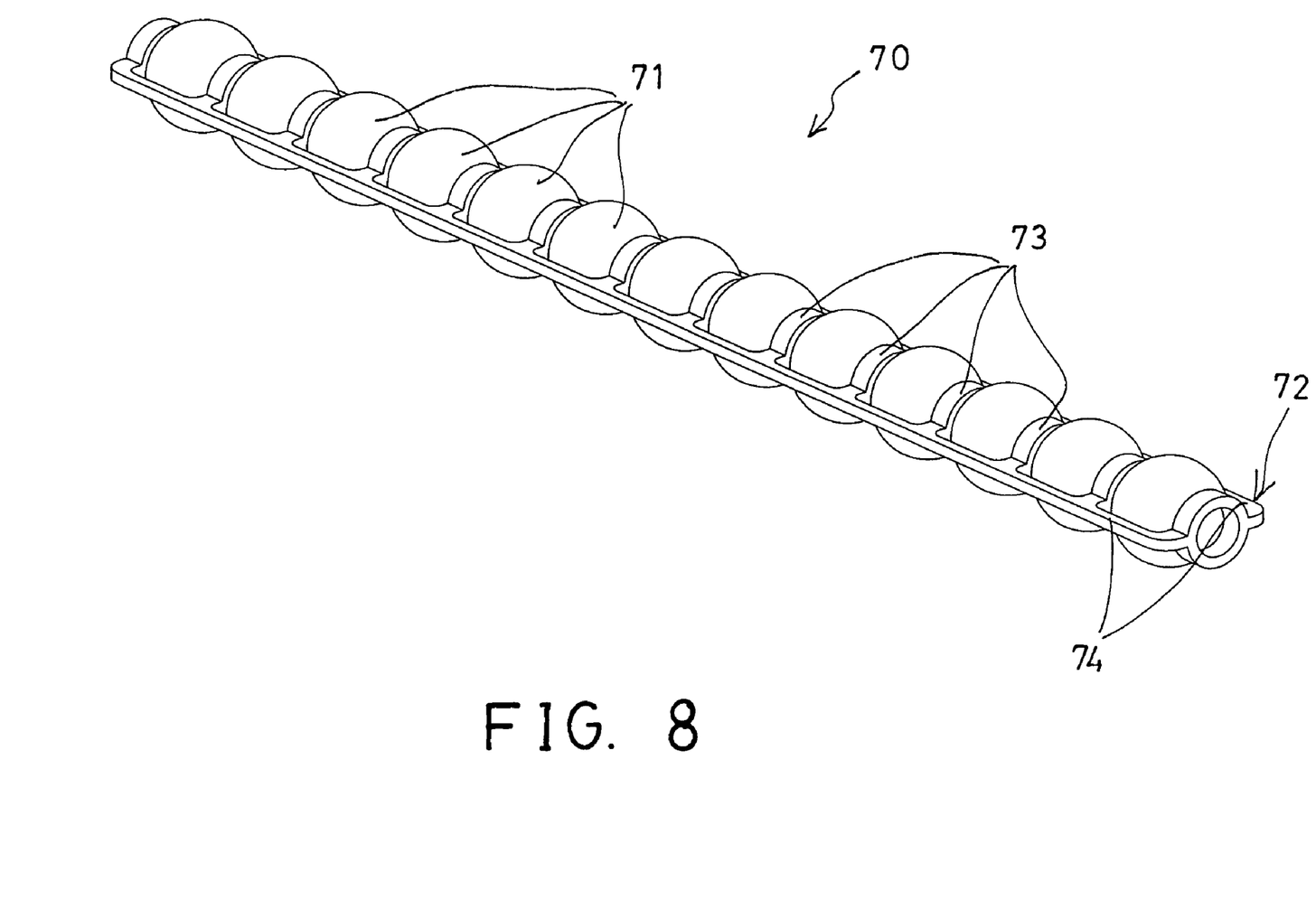
FIG. 8 is a perspective view illustrating the ball bearing device of the linear motion guide apparatus.

As shown in FIG. 3, the slider 20 may include one or more passages 25 formed therein for slidably receiving or engaging with the bars 74 of the retaining device 72, and as shown in FIGS. 6 and 7, the end caps 30 and/or the plate 40 may include one or more curved slots 34 formed therein and aligned with the passages 25 of the slider 20 and also for slidably receiving or engaging with the bars 74 of the retaining device 72. The balls or rolling members 71 of the retaining device 72 may thus be stably retained together and may thus be guided to smoothly move through the endless ball guiding channels 80 of the linear motion guide apparatus 1 without striking onto the end caps 30 and the slider 20 and the plate 40 and without generating noises.

Accordingly, the linear motion guide apparatus in accordance with the present invention includes an improved ball guiding channel formed therein for facilitating the sliding of the ball bearing device through the linear motion guide apparatus and for preventing the ball bearing device from striking onto the linear motion guide apparatus and for reducing the noises that may be generated while the ball bearing device moves through the linear motion guide apparatus.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide apparatus comprising:
    a guide rail including two side portions each having at least one longitudinal groove formed therein,
    a slider slidably attached onto said guide rail and including a concave formed in a lower portion thereof for slidably receiving said guide rail and for allowing said slider to be guided to slide along said guide rail, said slider including at least two longitudinal groove formed therein and facing toward said at least one longitudinal groove of said guide rail respectively for forming a ball guiding channel between said slider and said guide rail, and said slider including two end portions each having two notches formed therein and communicating with said at least two longitudinal groove and said concave of said slider respectively,
    two end caps attached to the end portions of said slider and each including a concave formed therein for slidably receiving said guide rail and for guiding said end caps to slide along said guide rail, said end caps each including at least two turnaround formed therein and aligned with said at least two longitudinal groove of said slider respectively for forming said ball guiding channel, and
    two plates disposed between said slider and said end caps respectively and each including a concave formed therein for slidably receiving said guide rail and for guiding said plates to slide along said guide rail, said plates each including at least two ear extended therefrom and engaged into said notches of said slider respectively for stably anchoring and positioning said plates to said slider.

2. The linear motion guide apparatus as claimed in claim 1, wherein said slider includes at least two ball return pathways formed through said slider for forming said ball guiding channel between said slider and said guide rail together with said at least one longitudinal groove of said guide rail.

3. The linear motion guide apparatus as claimed in claim 1, wherein said plates each include an inverted U-shaped structure having two side legs and a beam laterally coupled between said side legs, said at least two ear of said plates are extended from said side legs of said plates respectively.

4. The linear motion guide apparatus as claimed in claim 3, wherein said plates each include at least one recess formed in each of said side legs and aligned with said at least two longitudinal groove of said slider respectively.

5. The linear motion guide apparatus as claimed in claim 4, wherein said at least two ear of said plates are extended from said side legs of said plates respectively and aligned with said at least one recess of said side legs of said plate to partially form said at least one recess of said side legs of said plate.

6. The linear motion guide apparatus as claimed in claim 3, wherein said slider includes at least two ball return pathway formed through said slider, and said plates each include at least one void formed in each of said side legs and aligned with said at least two ball return pathway of said slider respectively for forming said ball guiding channel together with said at least two ball return pathway of said slider.

7. The linear motion guide apparatus as claimed in claim 1 further comprising a ball bearing device disposed between said slider and said guide rail and disposed in said ball guiding channel for facilitating a sliding movement between said slider and said guide rail.

8. The linear motion guide apparatus as claimed in claim 7, wherein said ball bearing device includes a plurality of rolling members.

9. The linear motion guide apparatus as claimed in claim 8, wherein said ball bearing device includes a retaining device to couple said rolling members together.

10. The linear motion guide apparatus as claimed in claim 9, wherein said retaining device includes a plurality of spacers disposed between said rolling members.

11. The linear motion guide apparatus as claimed in claim 10, wherein said retaining device includes at least one bar for coupling said rolling members together.

12. The linear motion guide apparatus as claimed in claim 11, wherein said slider include at least one passage formed therein for slidably receiving said at least one bar of said retaining device.

13. The linear motion guide apparatus as claimed in claim 1, wherein said plates each include an inclined surface formed in an outer peripheral portion of each of said at least two ear for forming a smooth ball guiding structure between said at least two turnaround of said end caps and said at least two longitudinal groove of said slider and for forming a smooth ball guiding structure for said ball guiding channel.

* * * * *